Feb. 21, 1939.  V. W. KLIESRATH  2,148,271

CLUTCH CONTROL MECHANISM

Original Filed July 29, 1931

INVENTOR.
VICTOR W. KLIESRATH
BY H. O. Clayton
ATTORNEY

Patented Feb. 21, 1939

2,148,271

UNITED STATES PATENT OFFICE 2,148,271

CLUTCH CONTROL MECHANISM

Victor W. Kliesrath, South Bend, Ind., assignor to Bragg-Kliesrath Corporation, South Bend, Ind., a corporation of New York Original application July 29, 1931, Serial No. 553,730. Divided and this application October 11, 1935, Serial No. 44,529

2 Claims. (Cl. 192—109)

This invention relates in general to the power transmission mechanism of an automotive vehicle and in particular to means for controlling the operation of the conventional clutch connecting the power plant with the driving shaft.

The present vogue of automatic declutching of the aforementioned driving and driven elements of the propelling mechanism has given rise to numerous new problems in the control of the vehicle; not the least of such problems is that of starting the vehicle in traffic and with the clutch disengaged by virtue of the operation of the clutch operating mechanism.

The present invention is particularly concerned with that type of declutching device disclosed in the patent to Belcia, No. 1,470,272, dated October 9, 1923, wherein the clutch pedal is automatically vacuum operated to disengage the clutch plates when and if the accelerator pedal is released to idle the engine, and likewise automatically permitted to return to its clutch engaged position as the accelerator is moved to open the throttle: however, it is apparent that a control of the clutch engagement is desirable with the construction disclosed in said patent, particularly when the car is at a standstill before a stop light, for it is at this time that a slipping engagement of the clutch plates is demanded. At this time the driven plate is at rest and with the opening of the throttle and corresponding increase in R. P. M. of the driving plate it is necessary to ease in or slip the clutch to start the car smoothly.

Therefore, it is the principal object of the invention to improve the clutch controlling mechanism of the aforementioned patent by providing means for controlling the engagement of the clutch in starting the car, such means to simulate the corresponding conventional manual operation of the clutch.

To the above end there is provided a supplemental control means, preferably manually operated, for controlling the rate of clutch pedal movement under the action of the clutch spring.

There is further contemplated a structure wherein the operation of a valve, independent of the conventional actuator control valve, provides a dashpot control of the piston of a vacuum operated clutch operating fluid motor, said dashpot control being on the non-suction side of the piston.

A further object of the invention is to provide a clutch controlling mechanism comprising a pressure differential operated motor operatively connected to a clutch operating member, and further comprising a manually operable means so connected to said member as to control the clutch engaging movement thereof.

Other objects of the invention and desirable details of construction and combinations of parts will become apparent from the following detailed description of certain embodiments of the invention taken in conjunction with the accompanying drawing, in which.

Figure 1:
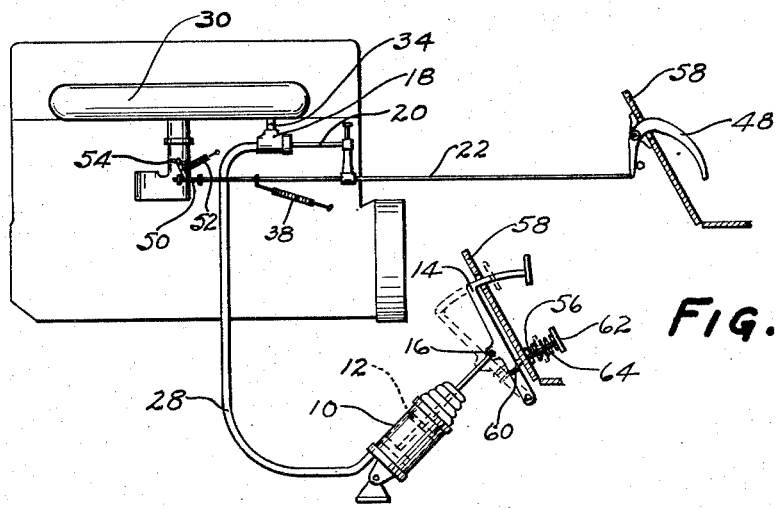
Figure 1 is a diagrammatic view of the clutch mechanism of the instant invention illustrating one form of supplemental means for controlling the clutch engagement.

In that embodiment of the invention disclosed diagrammatically in Figure 1 there is provided a power actuator comprising a cylinder 10 and piston 12, the latter being pivotally connected to the clutch pedal 14 at 16. The actuator is adapted to be energized at closed throttle to move the pedal to its disengaged position shown in dotted lines in the figure, and, broadly stated, to this extent the present invention is substantially the same as that of the aforementioned Patent No. 1,470,272. Briefly, the remaining power mechanism comprises a three-way valve member 18 which is operated, through the intermediary of links 20 and 22, to either vent the actuator to atmosphere via valve ports 24 and 26, Figure 3, and conduit 28 or place the actuator in circuit with the manifold 30 via valve ports 32 and 26 and conduits 34 and 28 to induce a vacuum on the suction side of the actuator piston 12.

Figure 3:
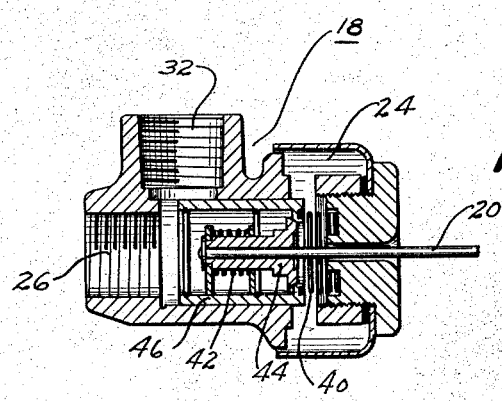
Figure 3 is a sectional view of the accelerator operated three-way control valve of Figure 1.

The valve structure per se, Figure 3, is more completely described, disclosed and claimed in an application of Victor W. Kliesrath No. 568,082, filed October 10, 1931, and forms no part of the instant invention.

At closed throttle position, Figure 1, the links 20 and 22 are tensioned by a spring 38 to compress valve springs 40 and 42, positioning valve members 44 and 46, as disclosed in Figure 3, to place the manifold in circuit with the actuator and thus induce a vacuum in the latter to disengage the clutch. A throttle opening movement of the accelerator pedal 48 places link 22 in compression, further tensioning spring 38, thereby permitting compressed valve springs 40 and 42 to successively expand to close the vacuum port 32 to the cylinder 10 and open the atmospheric port 24 to the same. The suction chamber of the actuator is then brought back to atmospheric pressure to permit clutch engagement in a manner to be more fully described hereinafter. It will also be noted that a lost motion at 50 and separate tension spring 52 on the butterfly valve lever 54 insure a successive venting of the actuator and opening of the throttle on the throttle opening movement of the accelerator and a successive closing of the throttle and energizing of the actuator on the throttle closing movement of the accelerator pedal.

The invention is particularly directed to means for damping or buffing clutch engagement, and more particularly to manually operated means for determining the rate of movement of the clutch pedal during the clutch plate engaging phase of the clutch operation. To this end there is disclosed in Figure 1 a thrust link 56 extending through the floorboard 58, said link being forked at one of its ends at 60 to fit over the clutch pedal 14. The link is provided at its end with a treadle pad 62, and a return spring 64 surrounding the link is interposed between the floorboard and the treadle.

As will be apparent, the operator may control the clutch engaging movement of the pedal 14 or its equivalent by depressing the link 56 into engagement with the pedal, when the same is in its clutch disengaged position, and subsequently releasing the link in a manner simulating a conventional operation of the clutch pedal.

The driver may, without inconvenience, keep his left foot on the treadle 62, inasmuch as the same only protrudes a short distance above the floorboard. When the accelerator is released, the cluch is automatically disengaged by power and the weight of the foot automatically depresses the fork 60 into engagement with the depressed clutch pedal; if desired, a crank may be employed in lieu of the pedal 14. Upon depressing the accelerator to initiate an engagement of the clutch, the driver immediately senses the pressure of the treadle upon his foot, and thereafter the clutch engaging movement of the treadle is controlled as desired.

Figure 2:
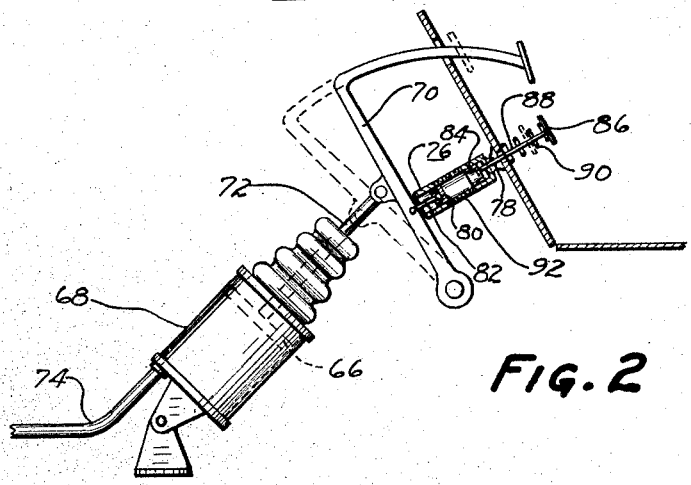
Figure 2 is a diagrammatic view disclosing another embodiment of clutch control mechanism similar in function to the mechanism of Figure 1.

In Figure 2 there is disclosed a modified form of clutch control mechanism wherein the piston 66 of a pressure differential motor 68 is operatively connected to a clutch pedal 70 by a link 72. The motor is placed in fluid transmitting connection with the intake manifold by a conduit 74, and to this extent the mechanism of Figure 2 is similar to that of Figure 1. In lieu of the spring pressed link 56 of Figure 1 there is provided a pneumatic control means. A cylinder 76 is pivotally connected to the floorboard at 78, said cylinder housing a piston 80 operatively connected to the clutch pedal by a link 82 and also housing a piston 84 operatively connected to a treadle 86 by a link 88. A return spring 90 is interposed between the treadle and the floorboard.

In operation, as previously described, the clutch is disengaged by the motor 68 upon releasing the accelerator and the motor is deenergized, to initiate a clutch engaging movement of the pedal 70, upon depressing the accelerator. Such engaging movement is, however, controlled by the aforementioned pneumatic mechanism. In effecting such control, the treadle 86 is depressed, moving the piston 84 downwardly to cover one or more ports 92 in the cylinder 76. The rate of movement of the piston 80 and its connected clutch pedal is determined by the rate of egress of air from the cylinder via said ports 92.

Should the driver desire to engage the clutch slowly, as for example in starting the vehicle from rest in low gear, the treadle 86 is considerably depressed to cover practically all of the ports 92. On the other hand, should a relatively rapid engagement of the clutch be desired, the treadle 86 is only slightly depressed, thereby exposing a greater number of the ports and effecting a relatively rapid efflux of air from the cylinder 76.

Although this invention has been described in connection with certain specific embodiments, the principles involved are susceptible of numerous other applications that will readily occur to persons skilled in the art. The invention is, therefore, to be limited only as indicated by the scope of the appended claims.

This application constitutes a division of my application No. 553,730, filed July 29, 1931.

I claim:

1. In an automotive vehicle provided with a clutch mechanism having a clutch pedal and further provided with a floorboard, means for controlling the clutch pedal movement during its engaging stroke comprising a cylinder member pivotally mounted on said floor board, said member having a plurality of openings therein, a piston member slidable in said cylinder and connected to said pedal, and manually operable piston valve means reciprocably mounted in said cylinder, said valve means being manually operable to selectively determine the rate of movement of said pedal by closing one or more of the aforementioned openings, depending upon the position of the valve within the cylinder.

2. In an automotive vehicle provided with a clutch, including a clutch spring, means for energizing said spring to release the clutch and for controlling the diminution of the potential energy of said spring in effecting the engagement of the clutch, said means including a left-foot operated treadle, a cylinder provided with a plurality of juxtaposed air bleed openings therein, a piston within the cylinder connected with the clutch and operative during its movement to close one or more of the aforementioned cylinder openings, and a valve member within the cylinder operatively connected with the treadle, said member serving to control the rate of movement of said piston by closing one or more of the bleed openings in the cylinder to thereby control the rate of engagement of the clutch.

VICTOR W. KLIESRATH.